(12) United States Patent
Horiguchi et al.

(10) Patent No.: US 7,699,225 B2
(45) Date of Patent: Apr. 20, 2010

(54) MAGNETIC HEAD FOR READING DATA

(75) Inventors: Masao Horiguchi, Kanagawa (JP); Minoru Ohsaka, Kanagawa (JP)

(73) Assignee: Techreco Company, Ltd., Kawasaki-si, Kanagawa (JP)

( * ) Notice: Subject to any disclaimer, the term of this patent is extended or adjusted under 35 U.S.C. 154(b) by 11 days.

(21) Appl. No.: 12/106,629

(22) Filed: Apr. 21, 2008

(65) Prior Publication Data

US 2008/0265032 A1    Oct. 30, 2008

(30) Foreign Application Priority Data

Apr. 27, 2007  (JP)  ............... 2007-118577
Oct. 19, 2007  (JP)  ............... 2007-272187

(51) Int. Cl.
*G06K 7/08*  (2006.01)

(52) U.S. Cl. ................................. 235/449

(58) Field of Classification Search ........... 235/449
See application file for complete search history.

(56) References Cited

U.S. PATENT DOCUMENTS

| | | | | |
|---|---|---|---|---|
| 2,920,149 A | * | 1/1960 | Koren | .................. 360/122 |
| 3,222,461 A | * | 12/1965 | Wood et al. | .................. 360/129 |
| 3,391,453 A | * | 7/1968 | Metz | ................... 29/603.12 |
| 3,586,788 A | * | 6/1971 | Page | .................. 360/129 |
| 4,118,747 A | * | 10/1978 | Hanaoka et al. | .................. 360/121 |
| 4,432,027 A | * | 2/1984 | Higuchi | .................. 360/246.1 |
| 4,788,613 A | * | 11/1988 | Yamashita | .................. 360/123.17 |
| 4,879,620 A | * | 11/1989 | Yamashita | .................. 360/123.17 |
| 5,497,283 A | * | 3/1996 | Kato | .................. 360/123.11 |
| 5,949,628 A | * | 9/1999 | Noboryu et al. | .................. 360/128 |
| 6,643,094 B2 | * | 11/2003 | Sato | .................. 360/123.39 |
| 2006/0077065 A1 | * | 4/2006 | Bassilious et al. | .................. 340/652 |

FOREIGN PATENT DOCUMENTS

JP    06325317 A  *  11/1994
JP    2002157702 A  *  5/2002

* cited by examiner

*Primary Examiner*—Michael G Lee
*Assistant Examiner*—Suezu Ellis
(74) *Attorney, Agent, or Firm*—Noval Druce + Quigg LLP

(57) ABSTRACT

A magnetic head of a credit card identification terminal for reading card data which can prevent card data from being illegally acquired. The magnetic head includes a generally box-shaped sealed case having an open side; a bobbin with an electric wire wound thereon provided in the sealed case; a core member extending from the bobbin and having an end protruding to the outside of the sealed case through a through-hole formed through a side of the sealed case opposite the opening; a terminal pin connected to the wire wound on the bobbin; and resin filled in the hollow space in the sealed case, the terminal pin is embedded in the resin filled in the sealed case, one end of a flexible wiring substrate is connected to the terminal pin, and the other end of the flexible wiring substrate extends to the outside of the sealed case from the opening.

15 Claims, 8 Drawing Sheets

MAGNETIC HEAD FOR READING DATA

CROSS-REFERENCE TO RELATED APPLICATIONS

The present application claims priority from Japanese Patent Application No. 2007-118577, filed Apr. 27, 2007 and Japanese Patent Application No. 2007-272187, filed Oct. 19, 2007, both incorporated herein by reference in their entirety.

FIELD OF THE INVENTION

The present invention relates to a magnetic head of a credit card identification terminal for reading card data which can prevent card data from being illegally acquired therefrom and through a signal conductor originating therefrom. In particular, the present invention relates to a magnetic head for a card reader which reads a signal from a magnetic card as a medium, and more particularly, to a magnetic head having a function of preventing skimming theft of card data by an illegal method.

BACKGROUND OF THE INVENTION

In recent years, because of widespread use of the magnetic cards as credit cards, payments for purchases are often made by credit cards. More specifically, when a credit card is inserted into a credit card insertion slot of a credit card identification terminal in each store, the card data on the credit card of the customer is read by a card reader of the credit card identification terminal. Then, the owner of the credit card enters the pin number into the credit card identification terminal to make inquiry, personal identification and payment.

In such a credit card identification terminal, the card reader uses a magnetic head B as shown in FIG. 10 to read card data. The magnetic head B has two magnetic cores 23 made of a magnetic material and arranged opposite each other in a sealed case 22 with their first ends apart to form a gap 26, and the ends of the magnetic cores 23 are located in an opening formed through the magnetic recording medium sliding surface of the sealed case 22. To read the data on a credit card, the credit card is slid over the ends of the magnetic cores 23.

The other ends of the magnetic cores 23 are inserted in both sides of a bobbin 25 in the sealed case 22 and fixedly supported in the sealed case 22 by holders 24. In addition, the hollow space in the sealed case 22 is filled with an epoxy resin, and terminal pins 27 connected to the wire wound on the bobbin 25 protrude as external connection terminals from the bottom of the sealed case 22. Usually, first ends of a signal conductor are connected to the two terminal pins 27, and the signal conductor is connected to a read-write control circuit. A magnetic head having the same configuration as described above is described in JP-A-2002-157702.

In recent years, frequent occurrence of crimes in which a malicious third person illegally acquires personal information as card data on credit cards from credit card identification terminals in business locations where credit cards are used and conducts a commercial transaction or e-commerce via the Internet with a forged credit card including the acquired card data to impose the debit obligation on the legal credit card owner has become a social issue.

SUMMARY OF THE INVENTION

The illegal acquisition of card data is made by opening the credit card identification terminal and connecting the terminals of another data acquisition device to the terminal pins as external connection terminals protruding from the bottom of the magnetic head in the credit card identification terminal by soldering or with clips to accumulate the card data transmitted during a transaction in a storage section in the data acquisition device. Naturally, such an act is not permissible.

The present invention has been made in view of the above circumstances and an object of the present invention is to provide a magnetic head of a credit card identification terminal for reading card data which can prevent card data from being illegally acquired therefrom and through a signal conductor originating therefrom in order to solve the problem.

The invention is a magnetic head including: a generally box-shaped sealed case having an open side; a bobbin with an electric wire wound thereon provided in the sealed case; a core member extending from the bobbin and having an end protruding to the outside of the sealed case through a through-hole formed through a side of the sealed case opposite the opening; an external connection terminal connected to the wire wound on the bobbin; and resin filled in the hollow space in the sealed case, in which the external connection terminal is embedded in the resin filled in the sealed case, one end of a signal conductor is connected to the external connection terminal, and in which the other end of the signal conductor extends through the filled resin to the outside of the sealed case from the opening.

If desired, for the magnetic head of the present invention, the core member extends from the both sides of the bobbin and the external connection terminal embedded in the resin filled in the sealed case is provided on a part of a flange of the bobbin on the opposite side from the opening, one end of a signal conductor is connected to the external connection terminal, and in which the other end of the signal conductor extends through the filled resin to the outside of the sealed case from the opening.

If desired, for the magnetic head of the present invention, the signal conductor includes a flexible wiring substrate including a signal conductor layer and protective layers covering the upper and lower surfaces of the signal conductor layer, the signal conductor layer having conductive lines extending from one end to the other for transmitting a signal from the magnetic head, each of the protective layers having a short-circuit detection screen extending over most of a surface thereof.

If desired, for the magnetic head of the present invention, the signal conductor layer includes a plurality of layers and the conductive lines are dispersed on each of the signal conductor layers. If desired, for the magnetic head of the present invention, the signal conductor layer includes a plurality of layers, and in which the conductive lines are provided only in some locations on each of the signal conductor layers and the conductive lines on adjacent layers of the signal conductor layer are connected to form conductive lines extending from one end to the other of the signal conductor layer including a plurality of layers. If desired, for the magnetic head of the present invention, dummy lines are provided adjacent to some of the conductive lines of the signal conductor layer of the flexible wiring substrate.

If desired, the magnetic head of the present invention, includes a plurality of bobbins in the sealed case, in which the signal conductor includes a plurality of pairs of twisted pair wires, first ends of each pair of twisted pair wires being connected to external connection terminals of different bobbins among the external connection terminals each connected to the wire wound on the corresponding bobbin in the sealed case, and the pairs of twisted pair wires are woven together.

EFFECT OF THE INVENTION

According to the present invention, an external connection terminal is provided inside the magnetic head and connected to a signal conductor at the location. Thus, even if a third person tries to steal card data from the magnetic head, a terminal of a data acquisition device cannot be connected to the external connection terminal without disassembling the magnetic head. Therefore, it is very difficult for a third person to acquire card data from the magnetic head for nefarious purposes.

In conventional magnetic heads, a rod-shaped terminal is used as an external connection terminal. Thus, when a signal conductor is attached to the rod-shaped terminal by soldering in a post-step in the factory or in an attaching process after shipping, a soldered part of an electric wire may be melted by heat from the iron and heat conduction to break the electrical contact therebetween or the rod-shaped terminal may be bent by the pressure from the worker's thumbs and fingers applied thereto during soldering, resulting in a wire disconnection under the tension in a processed portion which has been fixed. However, according to the magnetic head of the present invention, since the terminal connecting portion is away from the opening and since the external connection terminal is located inside the sealed case and fixed by the resin, no stress is exerted on the connecting portion between the external connection terminal and the electric wire. Thus, the wire disconnection can be prevented.

According to the invention, if desired, a flexible wiring substrate is used as the signal conductor, and the flexible wiring substrate is formed by a signal conductor layer sandwiched between protective layers each having short-circuit detection screen. Thus, if a third person scratches the flexible wiring substrate with the tip of a drill or the like when he or she tries to connect to a conductive line on the signal conductor layer in order to acquire card data on a credit card, the tip of the drill or the like breaks a conductive line on the signal conductor layer sandwiched between the protective layers and contacts the short-circuit detection screen of the upper or lower protective layer to cause a change in impedance or a short-circuit between the short-circuit detection screens. Then, a signal is transmitted to a short-circuit detection circuit provided separately and the abnormal condition is detected. It is, therefore, very difficult to acquire card data.

According to the invention, if desired, the signal conductor layer of the flexible wiring substrate may be composed of a plurality of layers and all or some of the conductive lines are dispersed on the layers of the signal conductor layer. Thus, since the signal lines are arranged in a three-dimensional fashion as well as in a two-dimensional fashion, the wiring pattern is so complicated that it is difficult for a third person to contact the conductive lines of the signal conductor for nefarious purposes.

In addition, according to the invention, if desired, dummy lines are provided adjacent to some of the conductive lines of the signal conductor layer, the wiring pattern is so complicated that it is difficult for a third person to contact the conductive lines of the signal conductor for nefarious purposes.

Further, according to the invention, if desired, a plurality of pairs of twisted pair wires may be used as the signal conductor, first ends of each pair of twisted pair wires are connected to the external connection terminals of different bobbins, and the pairs of twisted pair wires are woven together. Therefore, the wiring pattern of the signal conductor is so complicated that a third person cannot easily recognize the precise wiring pattern of the signal conductor. As a result, it is difficult for a third person to contact the conductive lines of the signal conductor for nefarious purposes.

DETAILED DESCRIPTION OF THE PREFERRED EMBODIMENTS

In a magnetic head including: a generally box-shaped sealed case having an open side; a bobbin with an electric wire wound thereon provided in the sealed case; a core member extending from the bobbin and having an end protruding to the outside of the sealed case through a through-hole formed through a side of the sealed case opposite the opening; an external connection terminal connected to the wire wound on the bobbin; and resin filled in the hollow space in the sealed case, the external connection terminal is embedded in the resin filled in the sealed case, one end of a signal conductor is connected to the external connection terminal, and the other end of the signal conductor extends through the filled resin to the outside of the sealed case from the opening. It is, therefore, difficult to connect a terminal of a data acquisition device to the external connection terminal of the magnetic head.

FIRST EMBODIMENT

Figure 1:
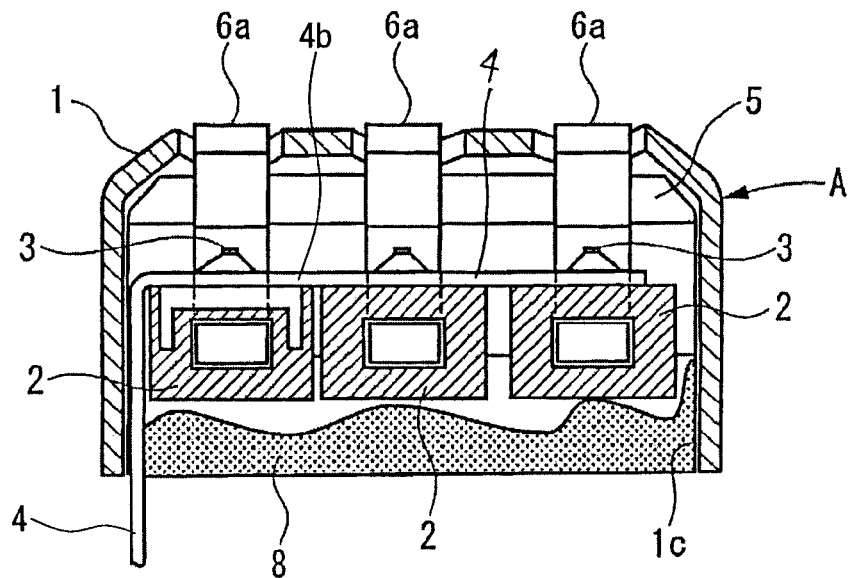
FIG. 1 is a cross-sectional side view of a magnetic head according to one embodiment of the present invention.
Figure 2:
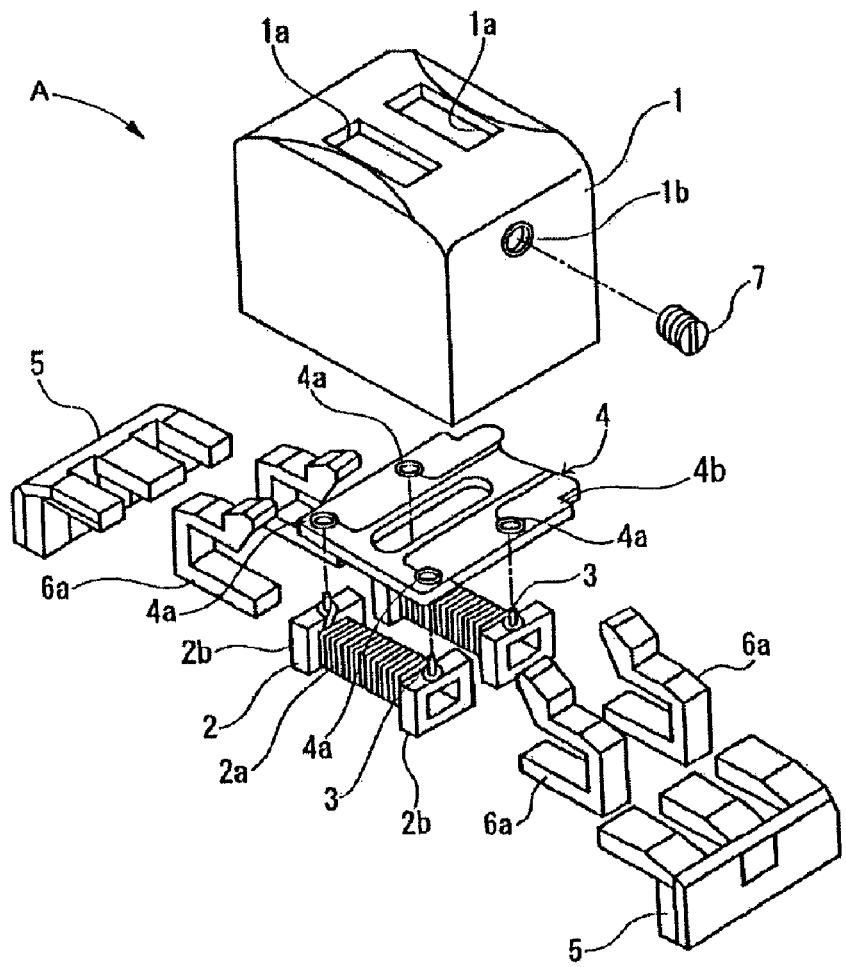
FIG. 2 is an exploded perspective view illustrating the configuration of the magnetic head according to one embodiment of the present invention.
Figure 3:
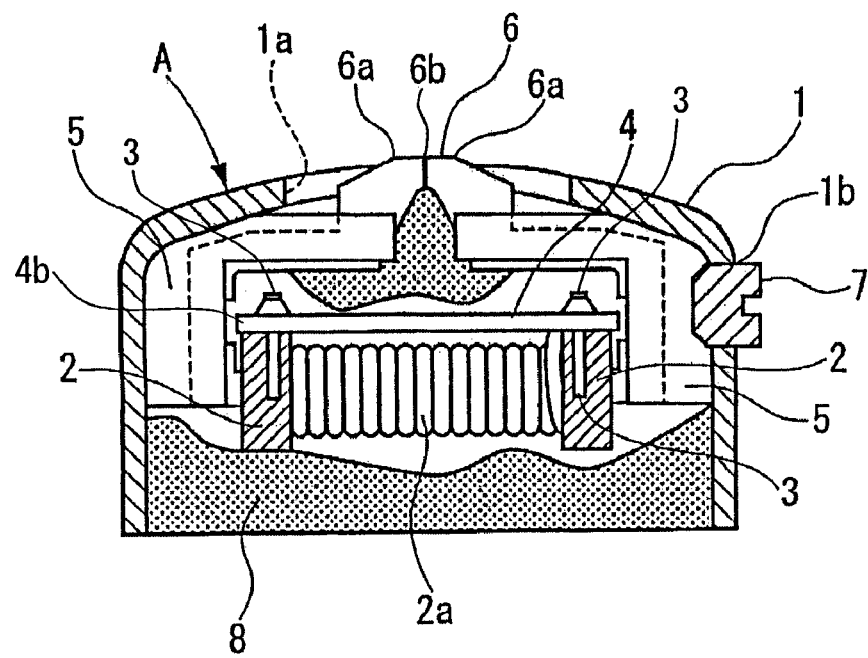
FIG. 3 is a cross-sectional front view of the magnetic head according to one embodiment of the present invention.
Figure 10:
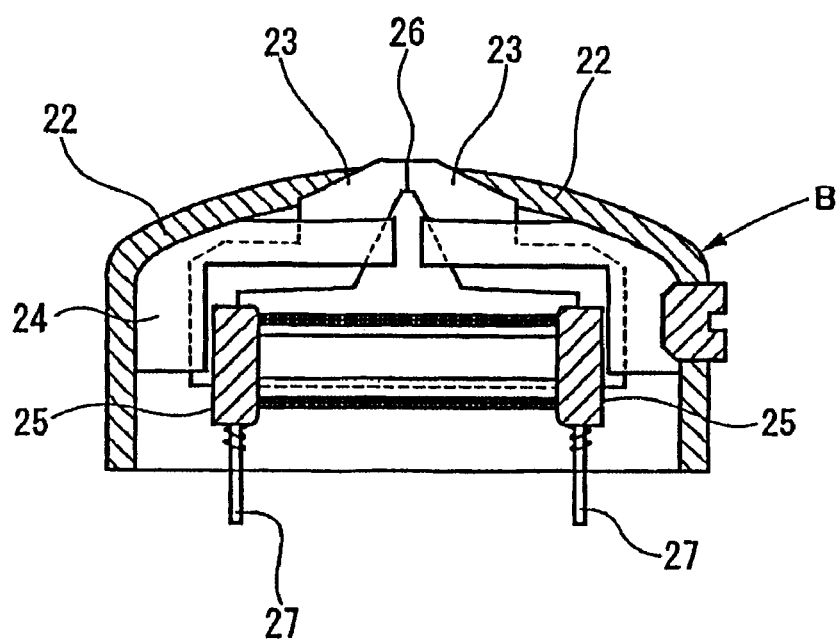
FIG. 10 is a cross-sectional view of a conventional magnetic head.

Description is hereinafter made of an embodiment of the present invention with reference to the drawings. FIG. 1 is a cross-sectional side view of a magnetic head according to the present invention. FIG. 2 is an exploded perspective view illustrating the configuration of the magnetic head according to the present invention. FIG. 3 is a cross-sectional front view of the magnetic head of the present invention.

As shown in FIGS. 1, 2 and 3, a magnetic head A according to one embodiment of the present invention has a plurality of bobbins 2, each with an electric wire 2a wound thereon, arranged with their longitudinal axes horizontal in a generally rectangular box-shaped sealed case 1 having an open bottom (the numbers of the bobbins 2 arranged are different between FIG. 1 and FIG. 2). Each bobbin 2 has flanges 2b at opposite ends, and terminal pins 3 as external connection terminals provided opposite each other on upper surfaces of the flanges 2b. The terminal pins 3 are connected to the electric wire 2a. A flexible wiring substrate 4 is used as a signal conductor. The flexible wiring substrate 4 has a connecting portion 4b at a first end having holes 4a formed therethrough at positions corresponding to the terminal pins 3. The terminal pins 3 are inserted in the holes 4a and connected to the flexible wiring substrate 4 by soldering.

The second end of the flexible wiring substrate 4 droops along one side of the bobbins 2 arranged side by side. Above the bobbins 2 to which the connecting portion 4b at the first end of the flexible wiring substrate 4 is connected, two pairs of core members 6a having a generally U-shape as viewed from front and supported by holders 5 having a generally right-angled hook shape as viewed from front (see FIG. 2) are mated from opposite right and left sides to form a core 6. The assembly is covered from above with the sealed case 1, and gapped parts 6b of the core 6 are respectively fitted in two rectangular through-holes 1a formed side by side on the top of the sealed case 1 and exposed to the outside of the sealed case 1.

After that, a screw 7 threadedly engaged in a through-hole 1b formed through one side of the sealed case 1 is tightened or loosened to move the holders 5 to adjust the gapped parts 6b to the most desirable position. Then, the entire hollow space inside the sealed case 1 is filled with resin 8 with the second end of the flexible wiring substrate 4 extending out from a bottom opening 1c of the sealed case 1 to fix the bobbins 2, the holders 5, the core 6 and so on in position. As a result, the terminal pins 3 in contact with the connecting portion 4b at the first end of the flexible wiring substrate 4 are located between the bobbins 2 and the core 6 and are not exposed.

Figure 4:
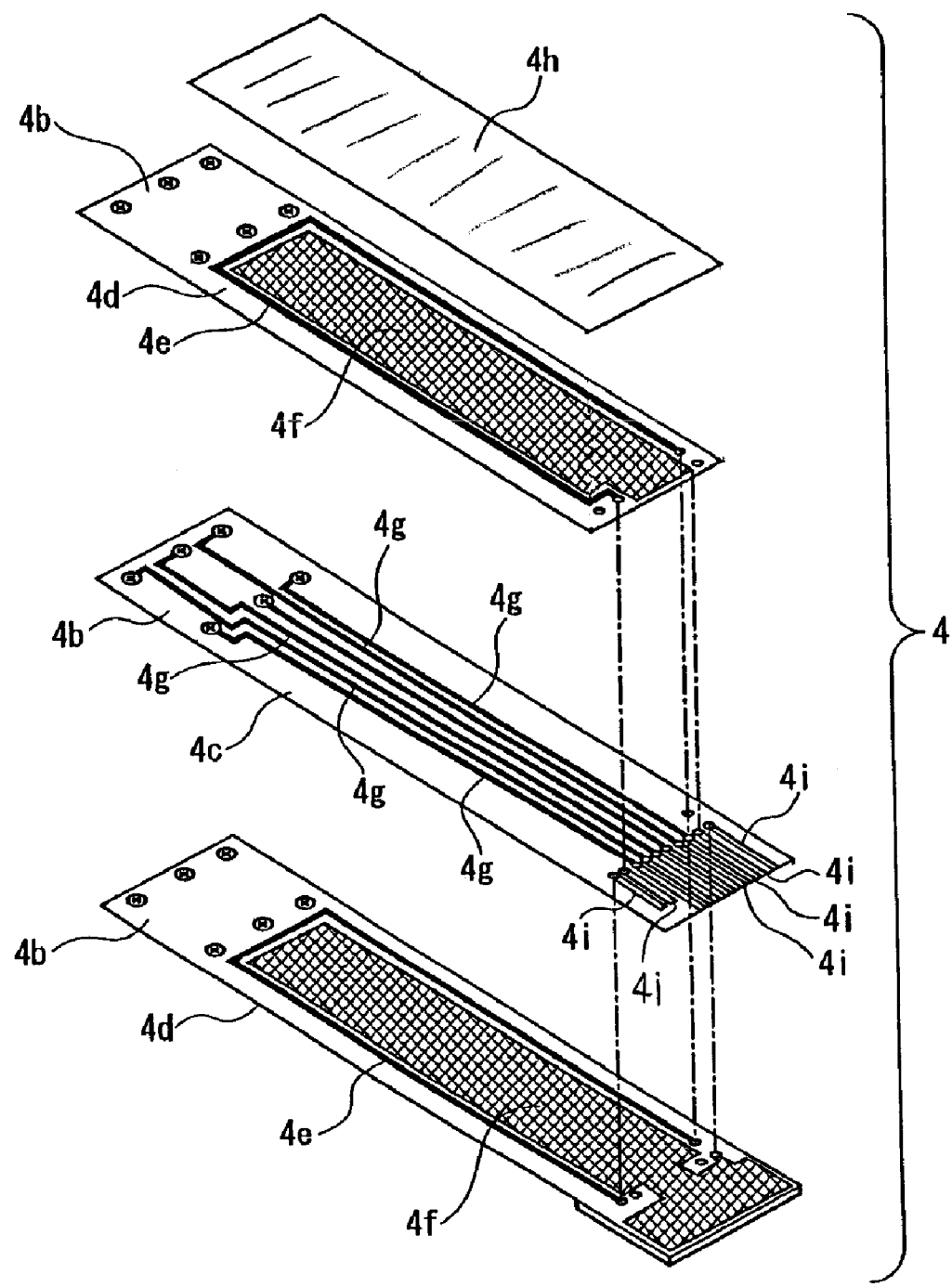
FIG. 4 is an exploded perspective view of a flexible wiring substrate of the magnetic head according to one embodiment of the present invention.
Figure 5:
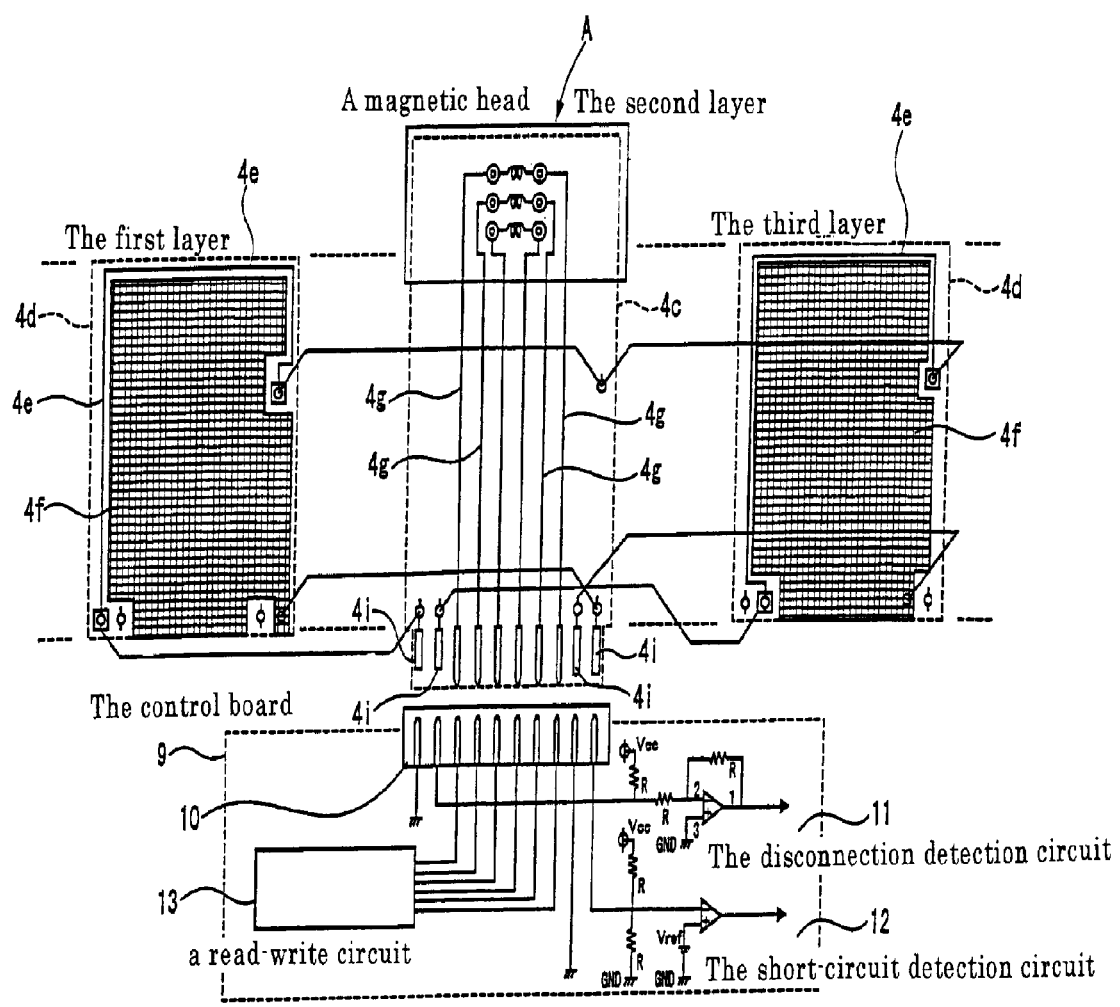
FIG. 5 is a circuit diagram of the flexible wiring substrate of the magnetic head and a control board according to one embodiment of the present invention.

The flexible wiring substrate 4 is next described. FIG. 4 is an exploded perspective view of the flexible wiring substrate of a magnetic head according to one embodiment of the present invention. FIG. 5 is a circuit diagram of the flexible wiring substrate and a control board.

The flexible wiring substrate 4 has a constant width and a constant shape, and, as shown in FIG. 4, is composed of three layers: a signal conductor layer 4c having conductive lines 4g extending from one end to the other for transmitting signals from the magnetic head A, and upper and lower protective layers 4d. Each protective layer 4d has a disconnection detection line 4e provided along the edges of one surface thereof except for the connecting portion 4b (provided in a generally U-shape, in this case). The disconnection detection lines 4e are provided to detect disconnection of external connection terminals 4i at the second end of the flexible wiring substrate 4 from a connector 10 of a control board 9 as described later. Since the disconnection detection lines 4e also have a function of detecting a wire breakage, the disconnection detection lines 4e extend to the immediate vicinity of the connecting portion 4b for connection with the magnetic head A.

A short-circuit detection screen 4f having a grid pattern is provided inside each disconnection detection line 4e, and the protective layers 4d cover the upper and lower surfaces of the signal conductor layer 4c.

A wiring concealing film 4h covers the upper surface of the upper protective layer 4d so that the disconnection detection lines 4e and the short-circuit detection screen 4f cannot be easily seen from outside. As the material for the wiring concealing film 4h, a material having flexibility such as aluminum foil, copper foil, paint or polymer film is selected. As a secondary usage of the wiring concealing film 4h, the product type, model number, material quality certificate, maker logo, lot-control number and so on may be marked on its surface.

The end of the upper the protective layer 4d on the side of the second end of the flexible wiring substrate 4 is shorter so that a second end of the signal conductor layer 4c is exposed. Ten external connection terminals 4i are provided at the second end of the signal conductor layer 4c.

The disconnection detection lines 4e of the upper protective layer 4d and the lower protective layer 4d are connected to the left two external connection terminals 4i (the external connection terminals 4i at the left side on the signal conductor layer 4c in FIGS. 4 and 5), respectively, of the ten external connection terminals 4i on the signal conductor layer 4c of the flexible wiring substrate 4, and the left two external connection terminals 4i are in turn connected to the connector 10 of the control board 9 for controlling signals from the magnetic head A. Therefore, a loop extending from a disconnection detection circuit 11 through one of the left two external connection terminals 4i, the disconnection detection line 4e of the upper protective layer 4d, the disconnection detection line 4e of the lower protective layer 4d, and the other of the two left external connection terminals 4i at the left side on the signal conductor layer 4c and back to the disconnection detection circuit 11 is formed, and a voltage is applied to the loop in operation.

The short-circuit detection screens 4f of the upper protective layer 4d and the lower protective layer 4d are connected to the right two external connection terminals 4i (the external connection terminals 4i at the right side on the signal conductor layer 4c in FIGS. 4 and 5), respectively, of the ten external connection terminals 4i on the signal conductor layer 4c of the flexible wiring substrate 4. The right two external connection terminals 4i are in turn connected to the connector 10 of the control board 9. Therefore, a circuit extending from a short-circuit detection circuit 12 through one of the two right external connection terminals 4i, the short-circuit detection screen 4f of the upper protective layer 4d, the short-circuit detection screen 4f of the lower protective layer 4d, and the other of the two right external connection terminals 4i and back to the short-circuit detection circuit is formed, and a biased voltage of direct current is applied to the circuit in operation.

The remaining six external connection terminals 4i (the remaining external connection terminals 4i on the signal conductor layer 4c in FIGS. 4 and 5) are respectively connected to the conductive lines 4g of the signal conductor layer 4c connected to the magnetic head A, and connected to a read-write circuit 13 of the control board 9 via the connector 10.

With this configuration, a malicious third person cannot connect a terminal of a data acquisition device (not shown) to any of the terminal pins 3 of the magnetic head A without disassembling the magnetic head A completely. Even if he or she disassembles the magnetic head A completely, he or she must assemble the magnetic head A again, which is extremely time consuming.

Also, when he or she tries to connect to any of the conductive lines 4g extending from the magnetic head A on the signal conductor layer 4c of the flexible wiring substrate 4, if the tip of a solder iron or drill, for example, contacts the short-circuit detection screen 4f of one of the protective layers 4d over and under the signal conductor layer 4c, the impedance of the short-circuit detection screen 4f is immediately changed or the short-circuit detection screens 4f of the protective layers 4d over and under the signal conductor layer 4c are electrically connected to each other to make a short-circuit and a signal is sent therefrom to the short-circuit detection circuit 12 to trigger alarm to inform the user of the abnormal condition.

Also, when one or both of the disconnection detection lines 4e are broken, it is transmitted to the disconnection detection circuit 11 and the abnormal condition of the flexible wiring substrate 4 is immediately detected. In this case, the cause of the abnormal condition is either contact of a malicious person with either of the disconnection detection lines 4e of the flexible wiring substrate 4 or disconnection of the external connection terminals 4i of the flexible wiring substrate 4 from the connector 10 of the control board 9. The detection and warning of an abnormality condition by the short-circuit detection circuit 12 or the disconnection detection circuit 11 makes it difficult to acquire card data (signal) from the flexible wiring substrate 4.

Figure 6:
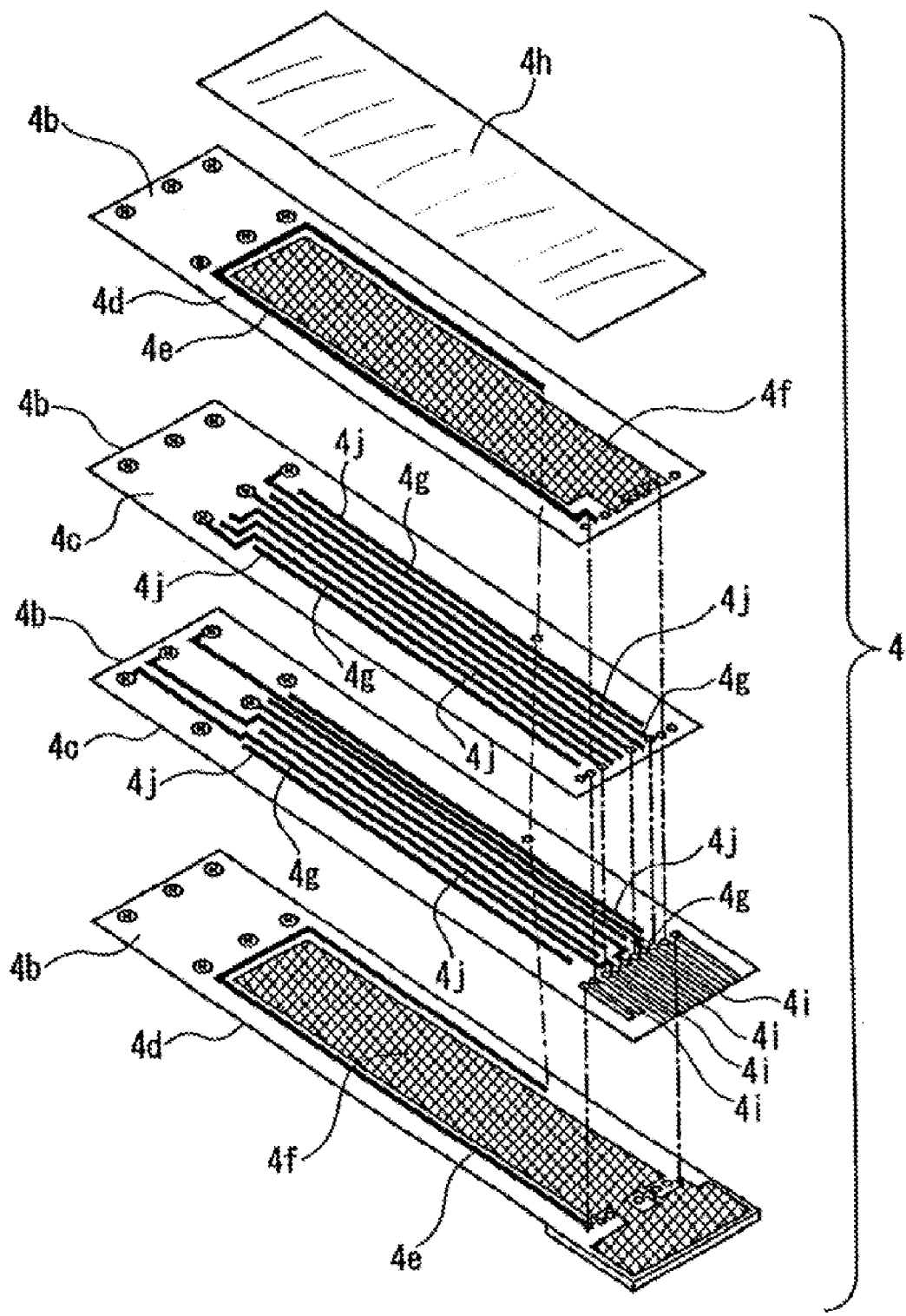
FIG. 6 is an exploded perspective view of another example of the flexible wiring substrate of the magnetic head according to one embodiment of the present invention.
Figure 7:
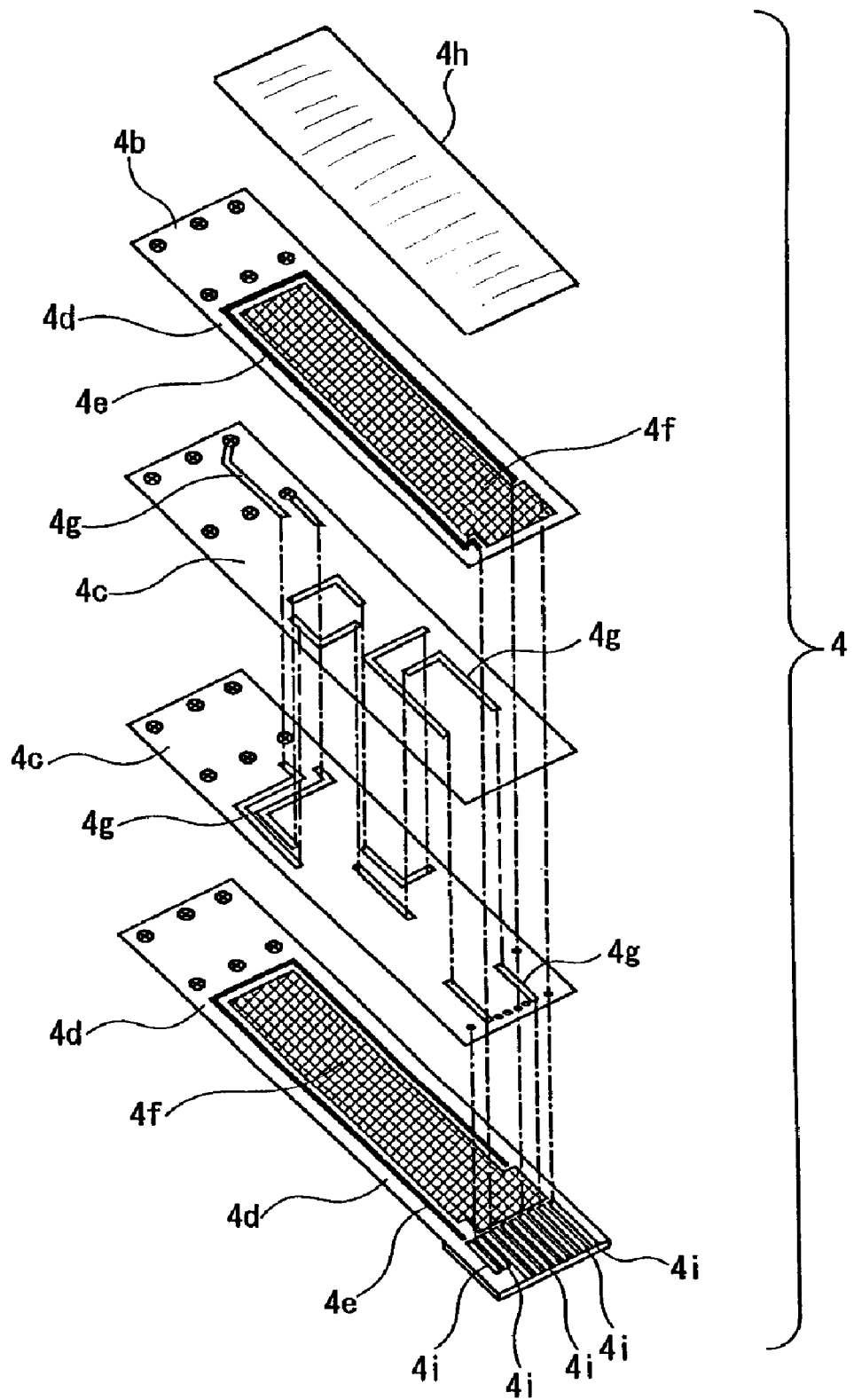
FIG. 7 is an exploded perspective view of another example of the flexible wiring substrate of the magnetic head according to one embodiment of the present invention.

FIG. 6 and FIG. 7 are exploded perspective views each illustrating another example of the flexible wiring substrate 4 according to one embodiment of the present invention.

The flexible wiring substrate 4 shown in FIG. 6 has a plurality of (two, in this example) signal conductor layers 4c laminated on top of each other. The conductive lines 4g are dispersed on the signal conductor layers 4c, and are connected to each other at the part where the external connection terminals 4i are located at the second end of one of the signal conductor layers 4c.

The flexible wiring substrate 4 shown in FIG. 7 has a plurality of (two, in this example) signal conductor layers 4c. A plurality of fragmentary conductive lines 4g are provided at some locations on each signal conductor layer 4c and connected to each other between the upper and lower signal conductor layers 4c. Thus, conductive lines as signal conductors run up and down between the signal conductor layers 4c of the flexible wiring substrate 4 and in directions parallel to and perpendicular to the longitudinal direction of the flexible wiring substrate 4 on each signal conductor layer 4c before they reach the external connection terminals 4i at the second end of the flexible wiring substrate 4.

In addition, in the flexible wiring substrates 4 shown in FIG. 6 and FIG. 7, dummy lines 4j (shown only in FIG. 6) may be provided between any two adjacent conductive lines 4g on each signal conductor layer 4c. Then, the wiring pattern on the signal conductor layers 4c is so complicated that a third person cannot understand the wiring pattern easily and thus cannot make an illegal connection to the signal conductors easily.

Figure 8:
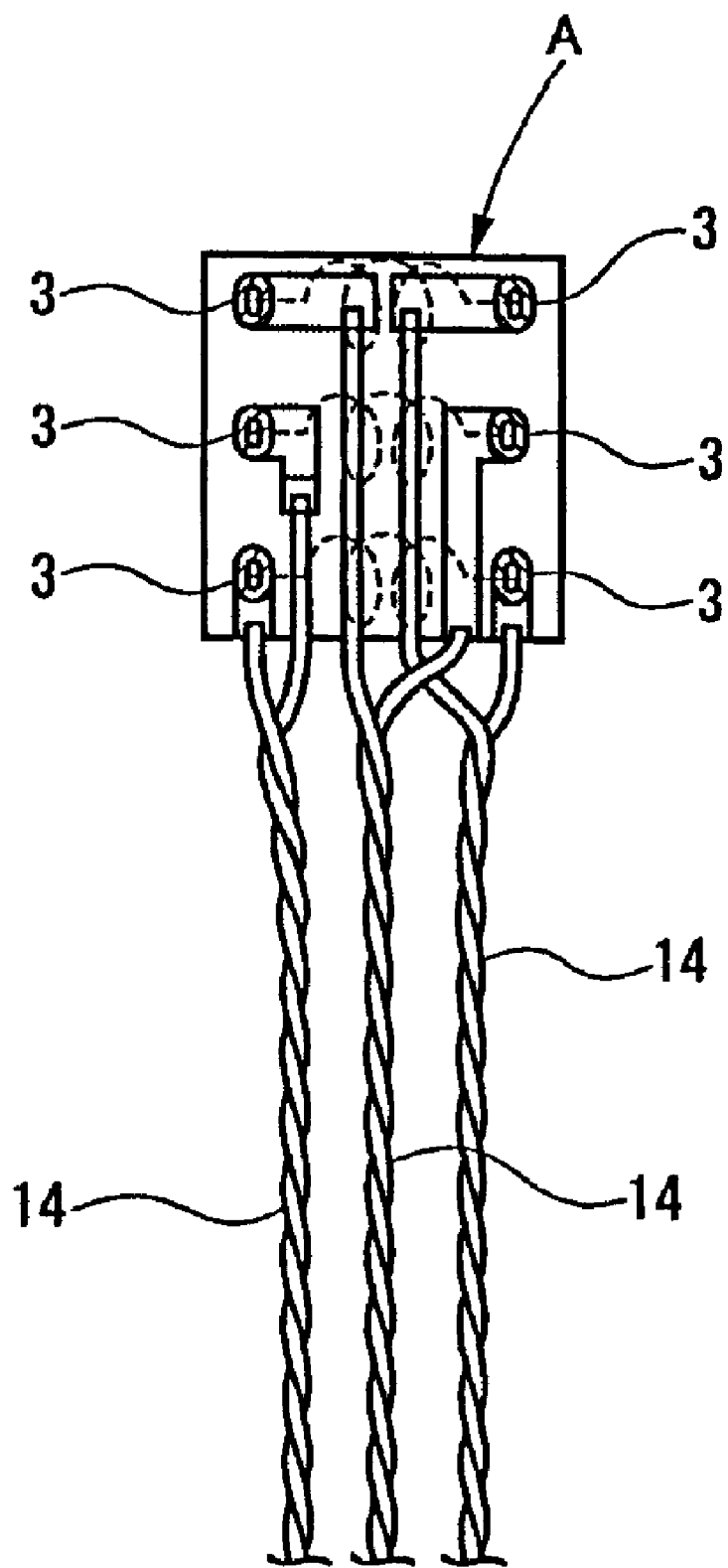
FIG. 8 is a partial plan view of the connecting portion of the magnetic head according to one embodiment of the present invention from which the protective cover has been removed with twisted pair wires connected thereto.
Figure 9:
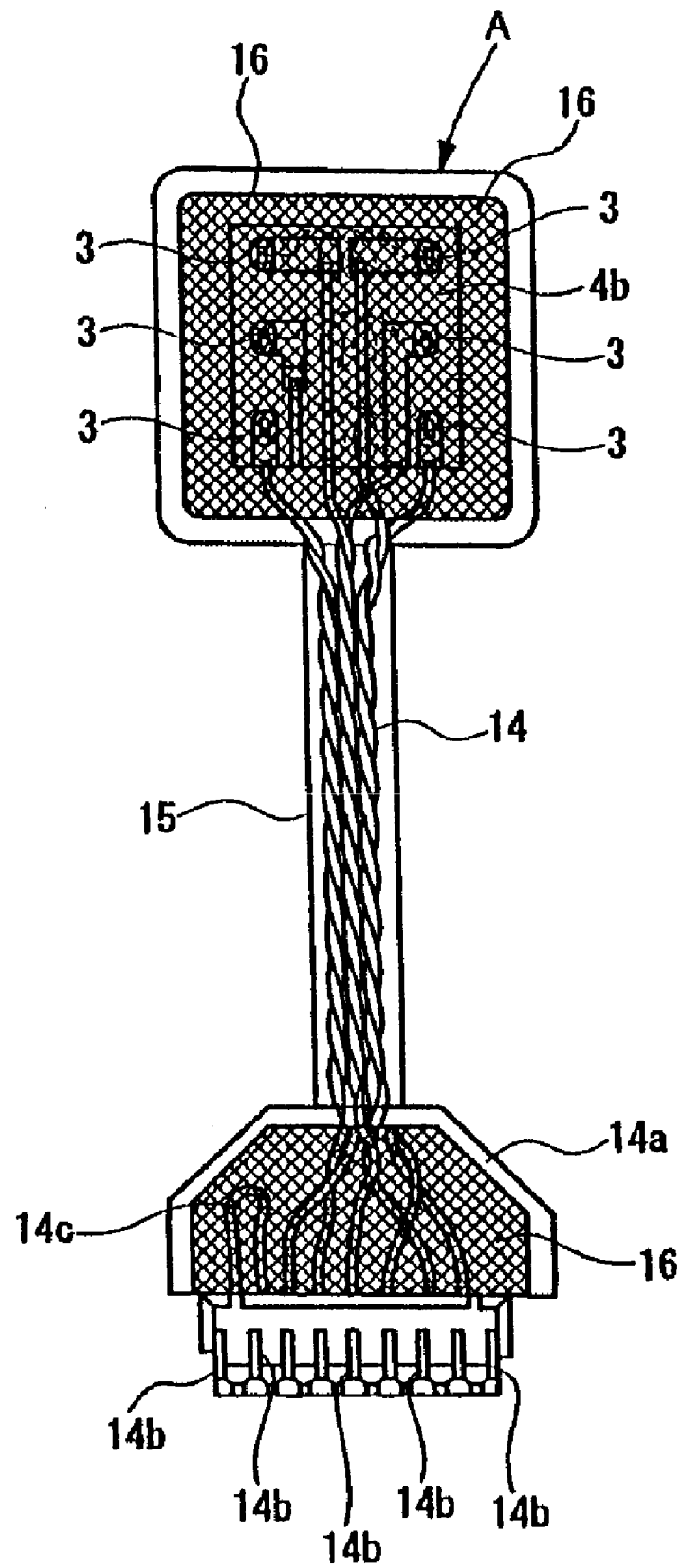
FIG. 9 is a plan view of the magnetic head according to the embodiment of the present invention to which twisted pair wires have been connected.

As another example, an example in which twisted pair wires 14 are used as the signal conductor instead of the flexible wiring substrate 4 is described. FIG. 8 is a partial plan view of the connecting portion of the magnetic head according to one embodiment of the present invention from which the protective cover has been removed with twisted pair wires connected thereto. FIG. 9 is a plan view of the magnetic head according to the embodiment of the present invention to which twisted pair wires have been connected.

In this case, three pairs of twisted pair wires 14 each consisting of two electric wires of the same color are prepared. The first ends of each pair of twisted pair wires 14 are respectively connected to two terminal pins 3 which belong to different bobbins 2 and are not opposed to each other among the terminal pins 3 provided opposite each other on the upper surfaces of the flanges 2b at both ends of each bobbin 2 (in FIG. 8, two terminal pins 3 lying in the lateral direction belong to one bobbin 2). After that, the three pairs of twisted pair wires 14 are twisted together. Then, the pairs of twisted pair wires 14 are covered with a concealing tube 15.

The second ends of the twisted pair wires 14 are covered with a resin cover 16 to form a connector portion 14a, and the inner space of the resin cover 16 is filled with resin (not shown) to fix the second ends. In addition, as shown in FIG. 9, a part of the connector portion 14a protrudes from an end edge of the resin cover 16, and eight external connection terminals 14b are provided in the protruded portion. A disconnection detection line 14c is provided using the left two external connection terminals 14b, and the other external connection terminals 14b are used to transmit signals transmitted from the magnetic head A via the twisted pair wires 14. The disconnection detection line 14c may be extended into the space in the magnetic head A filled with resin to impart a wire breakage detecting function to the extended disconnection detection line 14c.

While specific configurations of the flexible wiring substrate 4 are described in the above the embodiment, the configuration of the flexible wiring substrate 4 is not limited thereto. Other configuration may be employed as long as the constitutional requirements of this invention are satisfied and signals can be transmitted smoothly.

In addition, while the disconnection detection lines 4e and the short-circuit detection screens 4f of the upper and lower protective layers 4d are respectively connected to form a loop-shaped circuit in the flexible wiring substrate 4 having a three-layer structure, they may be provided on each layer as independent circuits. Also, both the disconnection detection lines 4e and the short-circuit detection screens 4f are not necessarily provided. Only the short-circuit detection screens 4f may be provided. While dummy lines 4j are provided in the flexible wiring substrate 4 having two signal conductor layers 4c, the dummy lines 4j are not limited to the flexible wiring substrate 4 having two signal conductor layers 4c and may be provided in other configurations.

While the short-circuit detection screens 4f have a grid pattern, the short-circuit detection screens 4f may have a stripe pattern or other configuration. While a wiring concealing film 4h is provided over the upper protective layer 4d, the wiring concealing film 4h may be omitted. In addition, the twisted pair wires 14 are covered with a concealing tube 15, the concealing tube 15 may be omitted.

DESCRIPTION OF REFERENCE NUMERALS AND SYMBOLS

A: magnetic head
1: sealed case
1a: hole
1c: opening
2: bobbin
2a: electric wire
3: terminal pin
4: flexible wiring substrate
4a: hole
4b: connecting portion
4c: signal conductor layer
4d: protective layer
4e: disconnection detection line
4f: short-circuit detection screen
4g: conductive line
4h: wiring concealing film
4i: external connection terminal
4j: dummy line
5: holder
6: core
6a: core member
7: screw 8: resin
9: control board
10: connector
11: disconnection detection circuit
12: short-circuit detection circuit
13: read-write circuit
14: twisted pair wires
14a: connector portion
14b: external connection terminal
15: concealing tube
16: resin cover It should be apparent that embodiments other than those expressly described above may come within the spirit and scope of the present invention. Thus, the present invention is not defined by the above-described description but rather is defined according to the following claims.

The invention claimed is:

1. A magnetic head comprising:
a generally box-shaped sealed case having an opening; a bobbin with an electric wire wound thereon provided in the sealed case; a core member extending from the bobbin and having an end protruding to the outside of the sealed case through a through-hole formed through a side of the sealed case opposite the opening; an external connection terminal connected to the wire wound on the bobbin; and resin filled in a hollow space in the sealed case,
wherein the external connection terminal is embedded in the resin filled in the sealed case,
wherein the core member extends from both sides of the bobbin and the external connection terminal is provided on a part of a flange of the bobbin on the opposite side from the opening,
wherein one end of a signal conductor is connected to the external connection terminal, and
wherein the other end of the signal conductor extends through the filled resin to the outside of the sealed case from the opening.

2. The magnetic head according to claim 1,
wherein the signal conductor comprises a flexible wiring substrate comprising a signal conductor layer and protective layers covering the upper and lower surfaces of the signal conductor layer, the signal conductor layer having conductive lines extending from one end to the other for transmitting a signal from the magnetic head, each of the protective layers having a short-circuit detection screen extending over most of a surface thereof.

3. The magnetic head according to claim 2,
wherein dummy lines are provided adjacent to some of the conductive lines of the signal conductor layer of the flexible wiring substrate.

4. The magnetic head according to claim 2,
wherein the signal conductor layer comprises a plurality of layers and
wherein the conductive lines are provided only in some locations on each of the signal conductor layers and the conductive lines on adjacent layers of the signal conductor layer are connected to form conductive lines extending from one end to the other of the signal conductor layer comprising a plurality of layers.

5. The magnetic head according to claim 1, comprising
a plurality of bobbins in the sealed case,
wherein the signal conductor comprises a plurality of pairs of twisted pair wires, first ends of each pair of twisted pair wires being connected to external connection terminals of different bobbins among the external connection terminals each connected to the wire wound on the corresponding bobbin in the sealed case, and the pairs of twisted pair wires are woven together.

6. The magnetic head according to claim 1, wherein the generally box-shaped sealed case has opposed first and second sides, the first side is an open side which is entirely open to define the opening and the second side defines the through-hole.

7. A magnetic head comprising:
a generally box-shaped sealed case having an opening; a bobbin with an electric wire wound thereon provided in the sealed case; a core member extending from the bobbin and having an end protruding to the outside of the sealed case through a through-hole formed through a side of the sealed case opposite the opening; an external connection terminal connected to the wire wound on the bobbin; and resin filled in a hollow space in the sealed case,
wherein the external connection terminal is embedded in the resin filled in the sealed case,
wherein one end of a signal conductor is connected to the external connection terminal, and
wherein the other end of the signal conductor extends through the filled resin to the outside of the sealed case from the opening,
wherein the signal conductor comprises a flexible wiring substrate comprising a signal conductor layer and protective layers covering the upper and lower surfaces of the signal conductor layer, the signal conductor layer having conductive lines extending from one end to the other for transmitting a signal from the magnetic head, each of the protective layers having a short-circuit detection screen extending over most of a surface thereof.

8. The magnetic head according to claim 7,
wherein the signal conductor layer comprises a plurality of layers and the conductive lines are dispersed on each of the signal conductor layers.

9. The magnetic head according to claim 8,
wherein dummy lines are provided adjacent to some of the conductive lines of the signal conductor layer of the flexible wiring substrate.

10. The magnetic head according to claim 7,
wherein the signal conductor layer comprises a plurality of layers and
wherein the conductive lines are provided only in some locations on each of the signal conductor layers and the conductive lines on adjacent layers of the signal conductor layer are connected to form conductive lines extending from one end to the other of the signal conductor layer comprising a plurality of layers.

11. The magnetic head according to claim 10,
wherein dummy lines are provided adjacent to some of the conductive lines of the signal conductor layer of the flexible wiring substrate.

12. The magnetic head according to claim 7,
wherein dummy lines are provided adjacent to some of the conductive lines of the signal conductor layer of the flexible wiring substrate.

13. The magnetic head according to claim 7, wherein the generally box-shaped sealed case has opposed first and second sides, the first side is an open side which is entirely open to define the opening and the second side defines the through-hole.

14. A magnetic head comprising:
a generally box-shaped sealed case having an opening; a bobbin with an electric wire wound thereon provided in the sealed case; a core member extending from the bobbin and having an end protruding to the outside of the sealed case through a through-hole formed through a side of the sealed case opposite the opening; an external connection terminal connected to the wire wound on the bobbin; and resin filled in a hollow space in the sealed case, a plurality of bobbins in the sealed case, wherein the external connection terminal is embedded in the resin filled in the sealed case, wherein one end of a signal conductor is connected to the external connection terminal, wherein the other end of the signal conductor extends through the filled resin to the outside of the sealed case from the opening, and wherein the signal conductor comprises a plurality of pairs of twisted pair wires, first ends of each pair of twisted pair wires being connected to external connection terminals of different bobbins among the external connection terminals each connected to the wire wound on the corresponding bobbin in the sealed case, and the pairs of twisted pair wires are woven together.

15. The magnetic head according to claim 14, wherein the generally box-shaped sealed case has opposed first and second sides, the first side is an open side which is entirely open to define the opening and the second side defines the through-hole.

* * * * *